March 30, 1965 P. TALMEY 3,175,940
PREFABRICATED HEAT-INSULATING PANELS
Filed Nov. 13, 1961 10 Sheets-Sheet 6

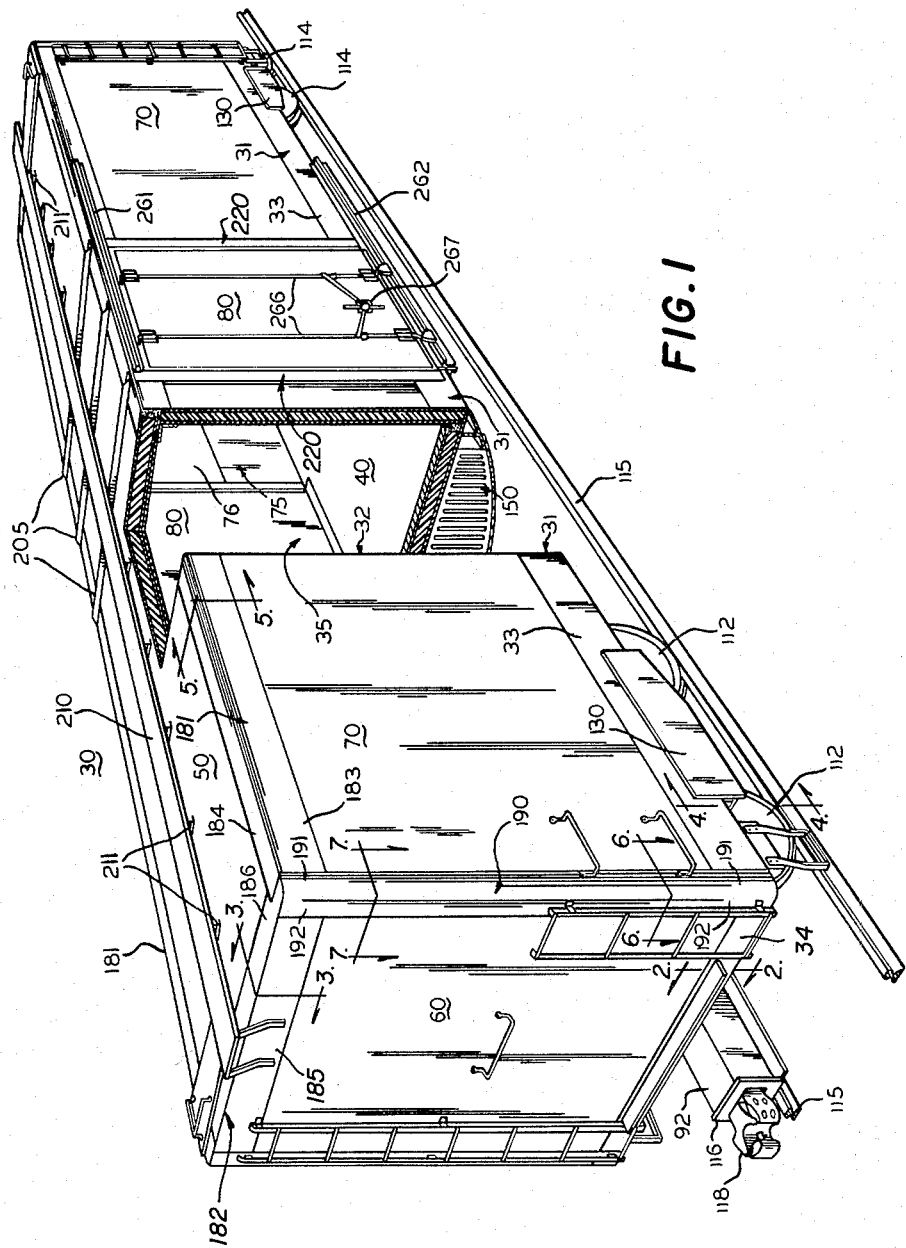

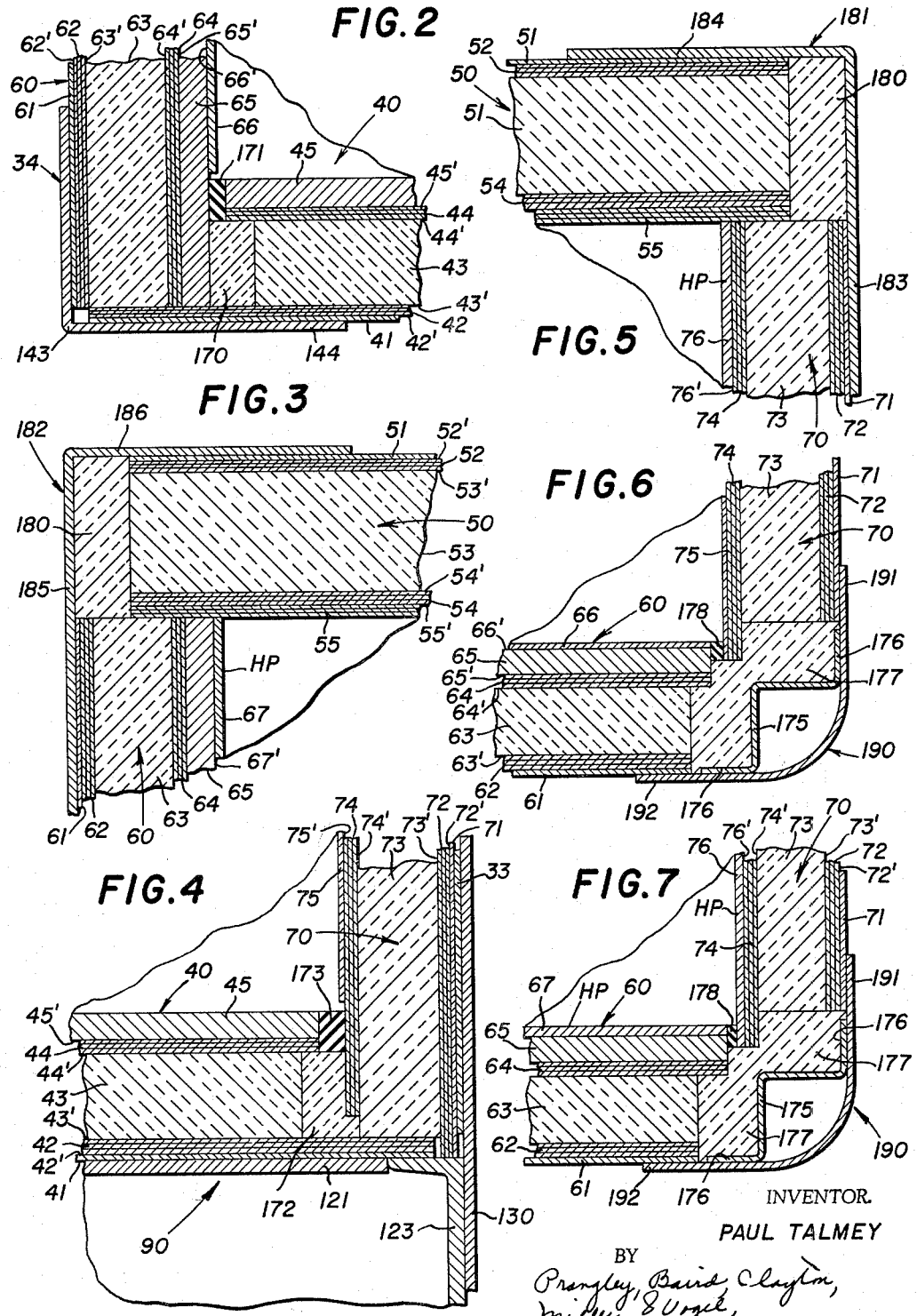

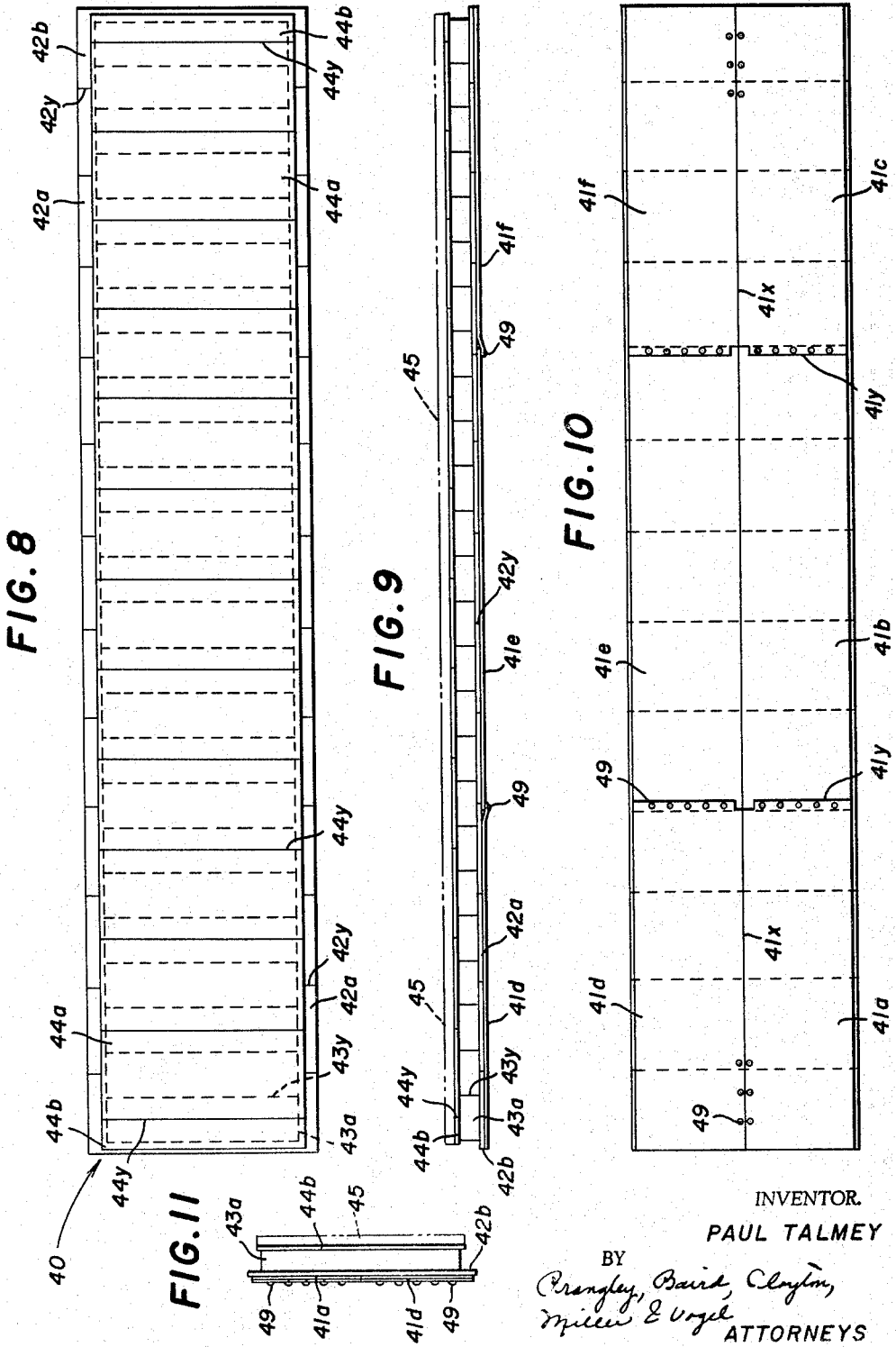

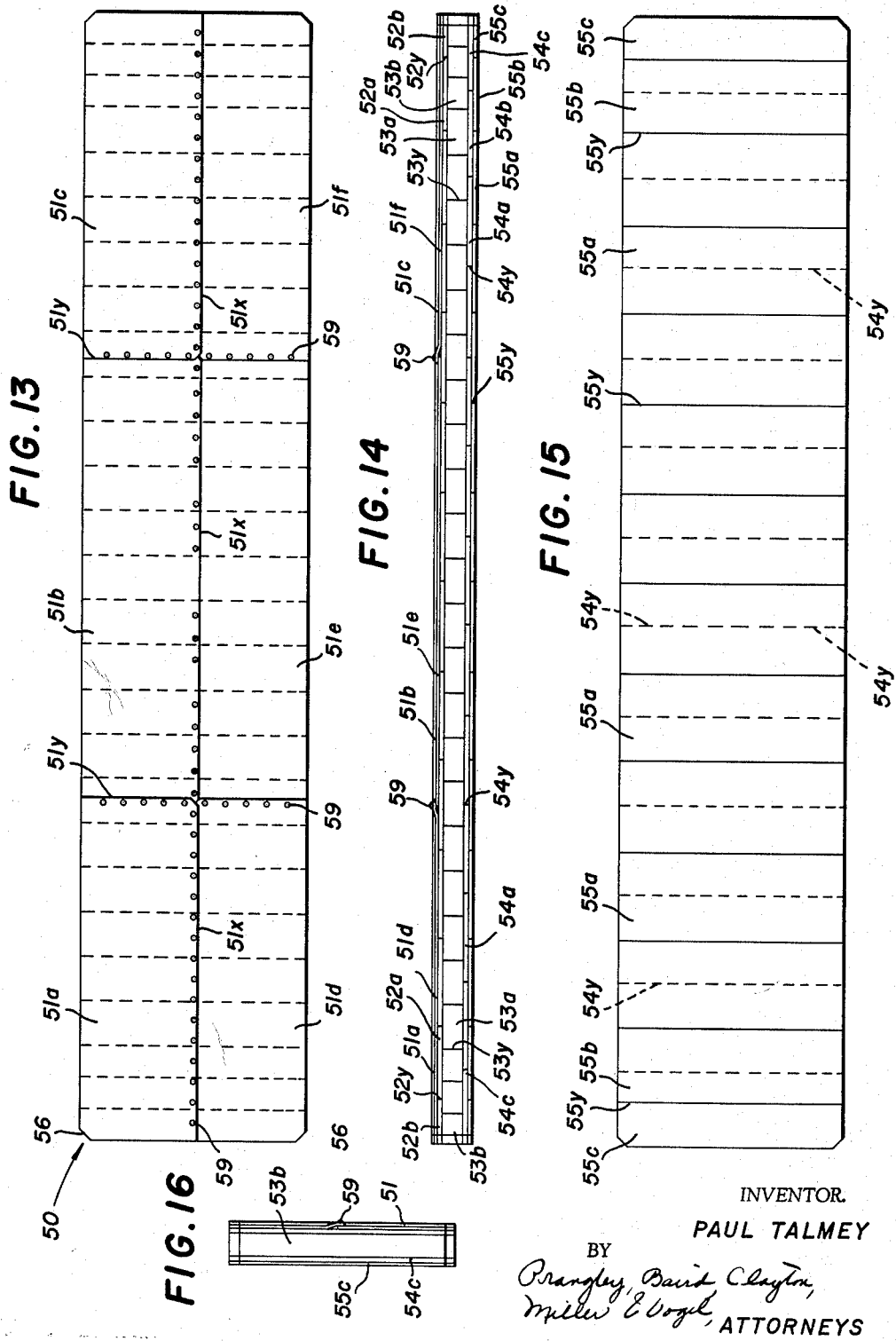

INVENTOR.
PAUL TALMEY
BY
ATTORNEYS

March 30, 1965 P. TALMEY 3,175,940
PREFABRICATED HEAT-INSULATING PANELS
Filed Nov. 13, 1961 10 Sheets-Sheet 7

INVENTOR.
PAUL TALMEY
BY
*Prangley, Baird Clayton,
Miller & Vogel*
ATTORNEYS

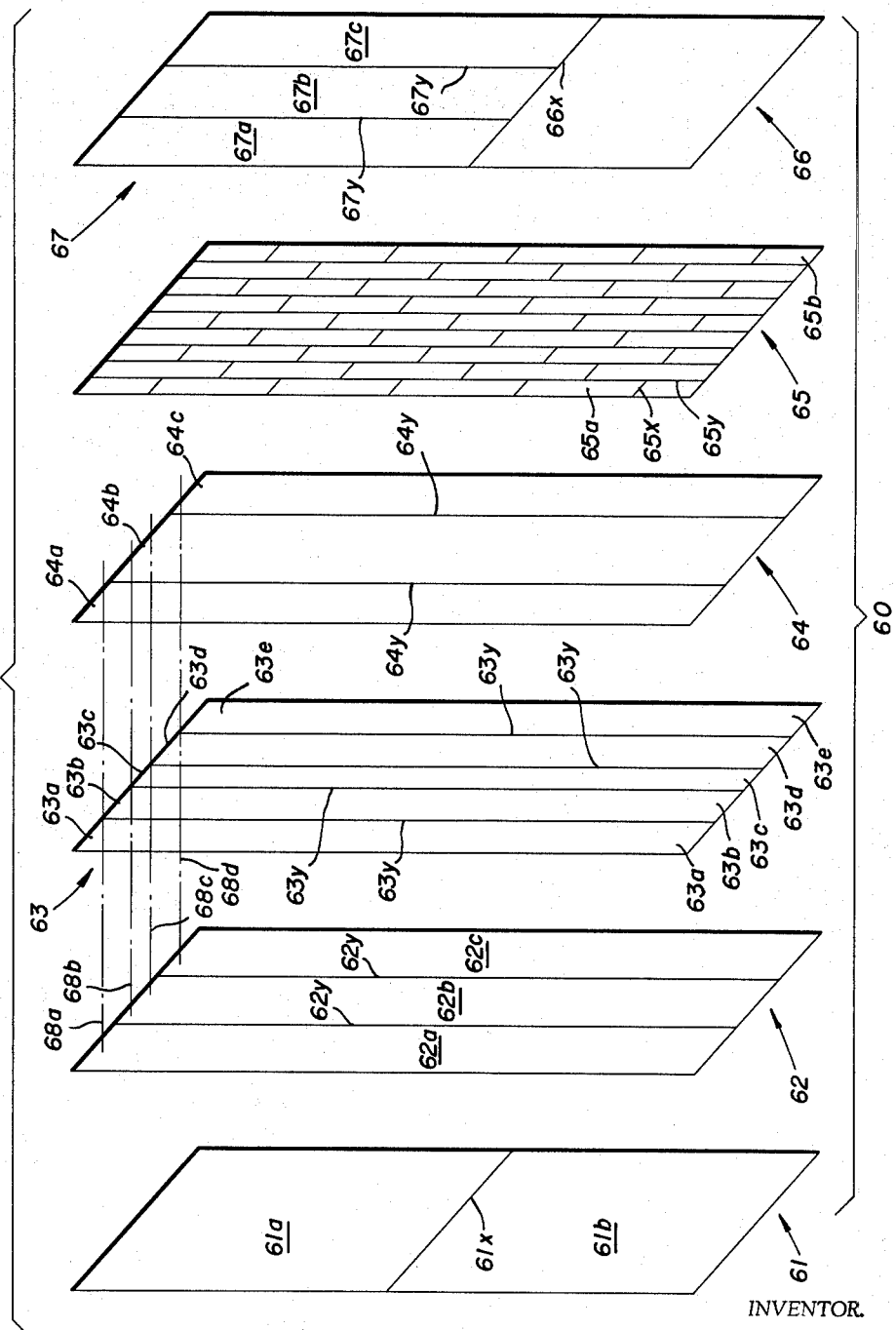

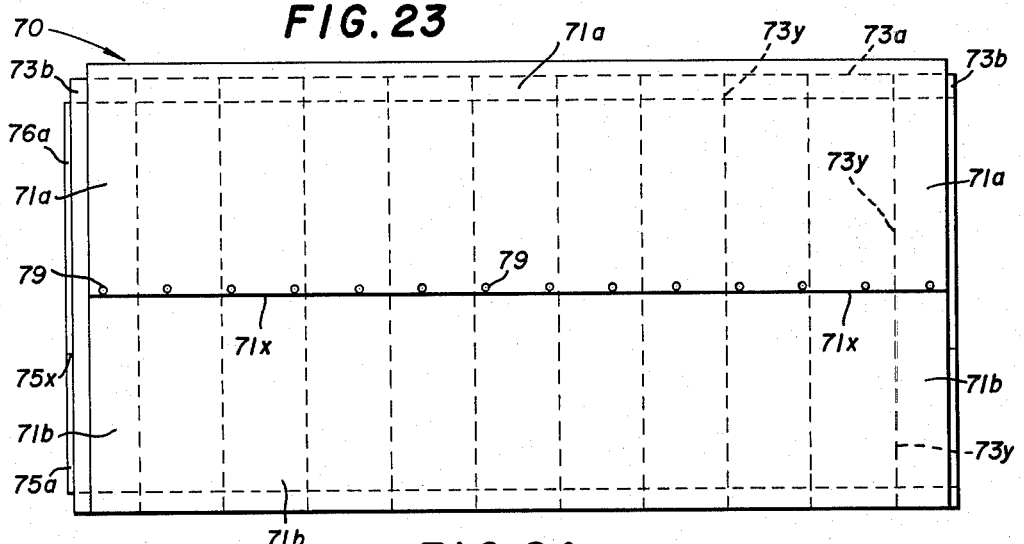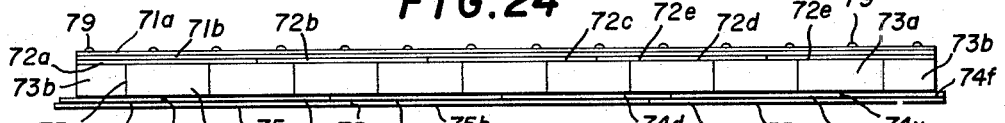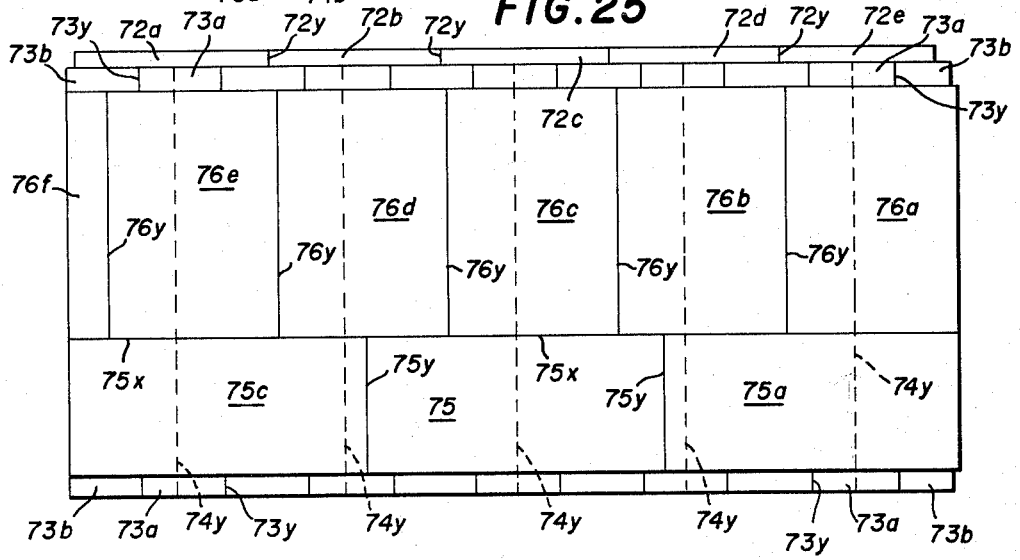

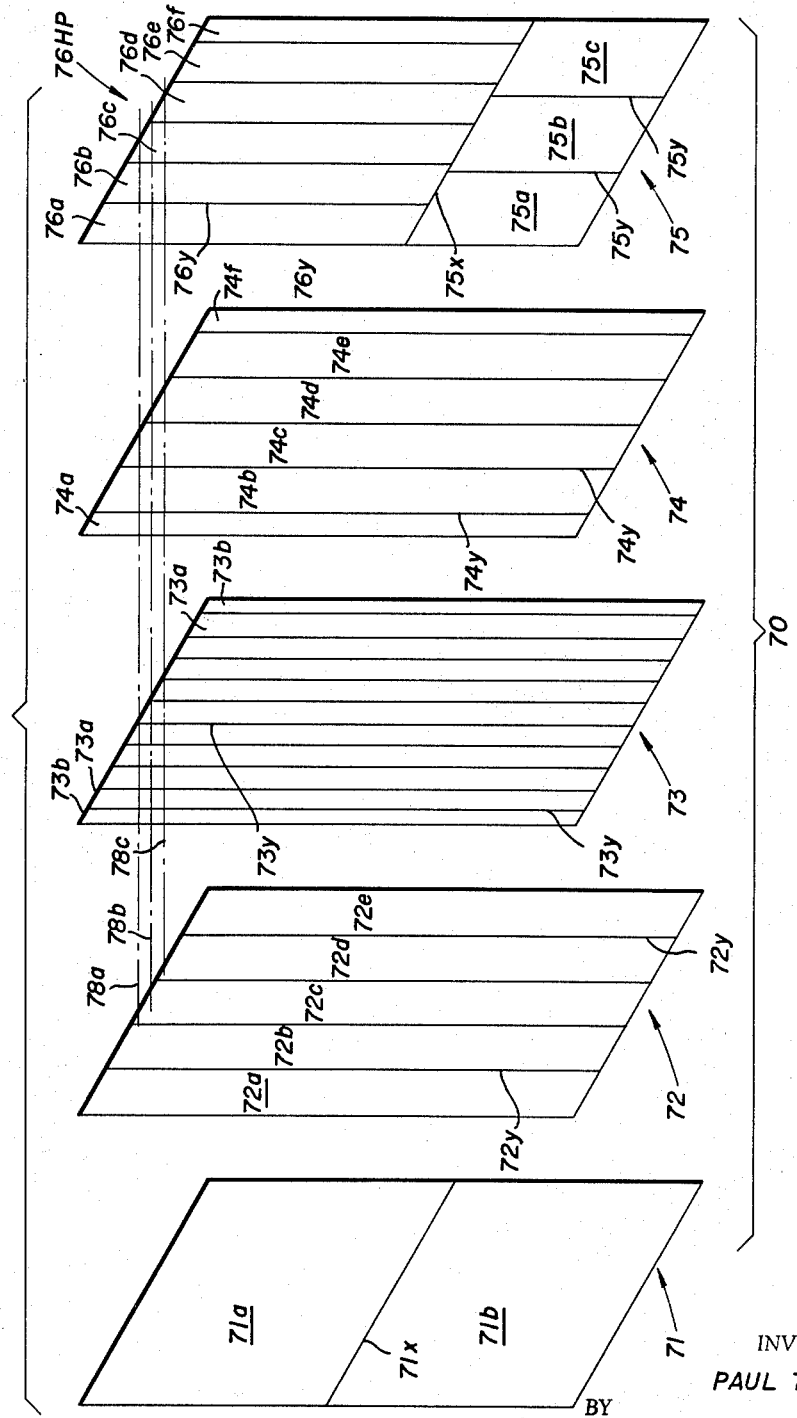

United States Patent Office 3,175,940
Patented Mar. 30, 1965

3,175,940
PREFABRICATED HEAT-INSULATING PANELS
Paul Talmey, Barrington, Ill., assignor to General American Transportation Corporation, Chicago, Ill., a corporation of New York
Filed Nov. 13, 1961, Ser. No. 151,645
29 Claims. (Cl. 161—41)

The present invention relates to prefabricated heat-insulating panels, and more particularly to heat-insulating panels that are self-supporting and of rigid unitary sandwich structure.

It is a general object of the invention to provide an improved prefabricated heat-insulating and self-supporting panel that is simple and economical to manufacture.

Another object of the invention is to provide an improved panel of the character noted that is characterized by particular structure rendering the same especially suitable for use in the intended location thereof.

Yet another object of the invention is to provide an improved panel of the character noted including an outer weather sheet of metal, a first plywood sheet, a slab of synthetic organic plastic resin of rigid cellular structure, a second plywood sheet, and a liner sheet, all intimately secured together in the order named.

In connection with the foregoing object, it is another object of the invention to provide an improved panel of the character noted wherein the plywood sheets and the slab are of composite construction and the joints therein are mutually offset with respect to each other through the thickness of the panel.

Still another object of the invention is to provide an improved panel of the character noted wherein the outer weather sheet is formed of steel or aluminum and the slab is formed of foamed polystyrene.

A further object of the invention is to provide an improved panel of the character noted including a first plywood sheet and a slab of synthetic organic plastic resin of rigid cellular structure and a second plywood sheet, all intimately secured together in the order named and each being of composite construction with the joints therein mutually offset with respect to each other through the thickness of the panel.

A further object of the invention is to provide an improved floor panel having the characteristics noted in which the liner sheet is a deck of hardwood flooring.

A further object of the invention is to provide an improved ceiling panel having the characterists noted in which the liner sheet is a sheet of plywood of composite construction having the joints therein mutually offset with respect to the other joints in the panel through the thickness of the panel.

A still further object of the invention is to provide an improved end wall panel having the characteristics noted in which the liner sheet includes a bulkhead of hardwood covered on the lower portions thereof with metal and on the upper portions thereof with another sheet of hardwood.

A still further object of the invention is to provide an improved side wall panel having the characteristics noted and in which the liner sheet includes a lower portion of metal and an upper portion of hardwood.

Further features of the invention pertain to the particular arrangement of the elements of the panels, whereby the above-outlined and additional operating features thereof are attained.

The invention, both as to its organization and method of operation, together with further objects and advantages thereof, will be best understood by reference to the following specification, taken in connection with the accompanying drawings, in which:

FIGURE 1 is a front perspective view of a heat-insulated railway box car, with a section thereof cut out and removed for purposes of illustration, the box car being made from panels embodying the present invention;

FIG. 2 is an enlarged vertical sectional view along the line 2—2 of FIG. 1 illustrating the joint between the floor panel and an end wall panel;

FIG. 3 is an enlarged vertical sectional view along the line 3—3 of FIG. 1 illustrating the joint between the ceiling panel and an end wall panel;

FIG. 4 is an enlarged vertical sectional view along the line 4—4 of FIG. 1 illustrating the joint between the floor panel and a side wall panel;

FIG. 5 is an enlarged vertical sectional view along the line 5—5 of FIG. 1 illustrating the joint between the ceiling panel and a side wall panel;

FIG. 6 is an enlarged horizontal sectional view along the line 6—6 of FIG. 1 illustrating the joint between a side wall panel and an end wall panel near the floor panel;

FIG. 7 is an enlarged horizontal sectional view along the line 7—7 of FIG. 1 illustrating the joint between a side wall panel and an end wall panel near the ceiling panel;

FIG. 8 is a plan or inside elevational view of the floor panel;

FIG. 9 is a side elevational view of the floor panel of FIG. 8;

FIG. 10 is a bottom or outside elevational view of the floor panel of FIGS. 8 and 9;

FIG. 11 is an end elevational view of the floor panel of FIGS. 8, 9 and 10;

FIG. 13 is a plan or outside elevational view of the ceiling panel;

FIG. 14 is a side elevational view of the ceiling panel of FIG. 13;

FIG. 15 is a bottom or inside elevational view of the ceiling panel of FIGS. 13 and 14;

FIG. 16 is an end elevational view of the ceiling panel of FIGS. 13, 14 and 15;

FIG. 22 is an exploded diagrammatic perspective view of the various plies of material that are incorporated in the end wall panel of FIGS. 18 to 21, inclusive;

FIG. 23 is a front or outside elevational view of one of the side wall panels;

FIG. 24 is a bottom view of the side wall panel of FIG. 23;

FIG. 25 is a rear or inside elevational view of the side wall panel of FIGS. 23 and 24;

FIG. 26 is a side elevational view of the side wall panel of FIGS. 23, 24 and 25; and FIG. 27 is an exploded diagrammatic perspective view of the various plies of material that are incorporated in the side wall panel of FIGS. 23 to 26, inclusive.

Figure 12:
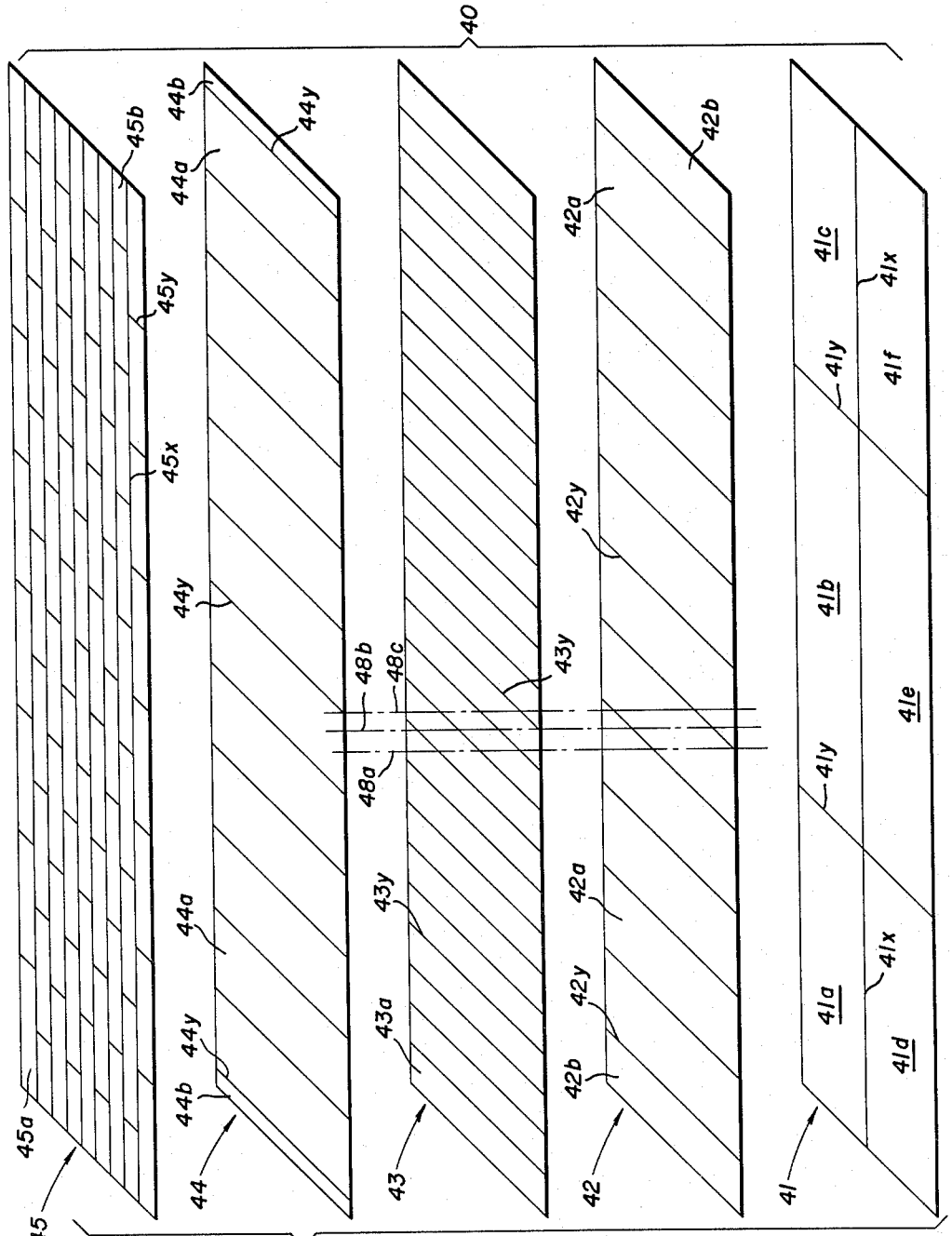
FIG. 12 is an exploded diagrammatic perspective view of the various plies of material that are incorporated in the floor panel of FIGS. 8 to 11, inclusive.

Although the use of the panels of this invention in a heat-insulated railway box car body has been shown in the drawings for the purpose of illustrating the present invention, it is to be understood that the heat-insulated panels of the present invention are of general utility and may advantageously be used wherever the superior properties thereof are applicable. More specifically, and by way of illustration, the heat-insulated panels of the present invention may be successfully utilized in building other freight carrier bodies including road semi-trailer bodies, truck freight bodies, container bodies, various refrigerated enclosures, stationary bunkers including refrigerated bunkers, warehouses, residential dwellings, and the like.

Referring now to FIG. 1, there is illustrated a heat-insulated railway box car 30 incorporating therein the improved panels embodying the features of the present invention, the car 30 comprising a unitized underframe and body, the underframe being of the cushioned type carrying a floating center sill, and the body consisting essentially of a plurality of preformed unitary panels of the present invention. More particularly, the car 30 comprises the elongated substantially rectangular underframe, indicated at 31, and the upstanding substantially box-like body, indicated at 32. Specifically, the underframe 31 includes a pair of longitudinally extending and laterally spaced-apart side sills 33 and a pair of laterally extending and longitudinaly spaced-apart end sills 34, the adjacent corners between the side sills 33 and the end sills 34 being rigidly secured together, as by welding, not shown, to form the unitary underframe 31. The body 32 includes an elongated substantially rectangular floor panel 40, an elongated substantially rectangular roof panel 50, a pair of upstanding substantially rectangular end wall panels 60, and two pairs of upstanding substantially rectangular side wall panels 70. The two pairs of side wall panels 70 are respectively disposed on the opposite sides of the body 32, and the two individual side wall panels 70 disposed on each side of the body 32 are arranged in longitudinally spaced-apart relation with respect to each other, so as to provide a corresponding upstanding substantially rectangular doorway in the adjacent central portion of the side of the body 32; whereby the two substantially centrally disposed doorways mentioned are arranged in lateral alignment with respect to each other. Also, the body 32 includes a pair of heat-insulated doors 80 of the exterior plug-type respectively carried by the sides thereof and respectively cooperating with the two doorways mentioned, as explained more fully hereinafter. Accordingly, the panels 40, 50, 60 and 70 cooperate with each other to define a lading compartment 35 within the body 32 that is accessible through the two centrally disposed doorways mentioned when the respective doors 80 occupy their open positions.

The underframe 31 further includes a pair of laterally extending and longitudinally spaced-apart body bolsters 90, see FIG. 4 also, respectively arranged adjacent to the opposite ends thereof and in supporting relation therewith; which body bolsters 90 include a top plate 121 and outer end member 123 and support an elongated longitudinally extending rigid center sill 92, the center sill 92 being mounted for longitudinal floating movements upon the body bolsters 90, the underframe 31 preferably incorporating cushioning mechanism that may be of the Waugh type.

The central portion of one of the body bolsters 90 carries a center bearing plate, now shown, disposed below the adjacent end of the center sill 92 and adapted to cooperate with the center plate of a truck bolster, not shown; which truck bolster forms a part of a conventional truck disposed therebelow and provided with track wheels 112, as indicated in FIG. 1; and in this conventional arrangement, the center bearing plate of the body bolster 90 is secured to the center plate of the truck bolster of the associated truck by a cooperating center pin, not shown, so as to accommodate the usual articulation of the truck with respect to the associated body bolster 90. Similarly, the central portion of the other body bolster 90 carries a center bearing plate, not shown, disposed below the adjacent end of the center sill 92 and adapted to coperate with the center plate of a truck bolster, not shown, which truck bolster forms a part of a conventional truck disposed therebelow and provided with track wheels 114, as indicated in FIG. 1; and in this conventional arrangement, the center bearing plate of the other body bolster 90 is secured to the center plate of the truck bolster of the associated truck by a cooperating center pin, not shown, so as to accommodate the usual articulation of the truck with respect to the associated other body bolster 90. Of course, the track wheels 112 and 114 respectively carried by the two trucks respectively disposed adjacent to the opposite ends of the underframe 31 cooperate with the usual railway track, indicated at 115 in FIG. 1.

The opposite ends of the center sill 92 respectively project longitudinally substantially beyond the outer ends of the car body 32 and respectively terminate in two striker plates 116, as illustrated in FIG. 1. The opposite ends of the center sill 92 are hollow and respectively carry conventional draft gears, not shown, of the resilient type. The draft gears respectively carry detachable car couplings 118 that respectively project through the associated striker plates 116; which car couplings 118 are entirely conventional and are employed for the usual car-coupling purpose. Of course, it will be understood that the draft gears transmit the draft forces between the two car couplings 118 through the center sill 92 of the car 30 and also provide a limited amount of shock-absorption and snubbing between the car couplers 118 and the center sill 92.

Each body bolster 90 further comprises a pair of laterally spaced-apart upstanding load transfer plates 130 respectively disposed on the opposite sides of the car 30 and respectively rigidly connecting together the outer end members 123 and the side sills 33 of the underframe 31. Thus, it will be understood that each of the two body bolsters 90 is rigidly secured at the outer ends thereof to the associated pair of load transfer plates 130, and that the two load transfer plates 130 are respectively rigidly secured to the adjacent side sills 33, thereby to provide rigid connections between each of the body bolters and the underframe 31.

Before proceeding with further description of the railway box car 30, it is advantageous to consider the construction and arrangement of the floor panel 40 that comprises a unitary portion of the underframe 31; whereby reference is made to FIGS. 2 and 4. More particularly, the floor panel 40 is of unitary composite sandwich construction including, as best shown in FIG. 12, an outer metal weather sheet 41, an adjacent outer plywood sheet 42, an adjacent slab 43 of synthetic organic resin of cellular structure, an adjacent inner plywood sheet 44, and an adjacent deck 45 of hardwood flooring. More specifically, the floor panel 40 is of unitary one-piece construction from end to end thereof and from side to side thereof; the lower surface of the deck 45 is intimately adhered to the adjacent upper surface of the plywood sheet 44 by an intervening layer of cement, indicated at 45'; the lower surface of the plywood sheet 44 is intimately adhered to the adjacent upper surface of the slab 43 by an intervening layer of cement, indicated at 44; the lower surface of the slab 43 is intimately adhered to the adjacent upper surface of the plywood sheet 42 by an intervening layer of cement, indicated at 43'; and the lower surface of the plywood sheet 42 is intimately adhered to the adjacent upper surface of the weather sheet 41 by an intervening layer of cement, indicated at 42'.

In a constructional example of the floor panel 40, the weather sheet 41 comprises a metal selected from the class consisting of aluminum and steel (including stainless steel); and preferably, the weather sheet 41 comprises a steel sheet of 24 gauge (25.0 mils). Each of the plywood sheets 42 and 44 comprises a fir plywood having a thickenss of about 5/16". The slab 43 comprises a foamed resin selected from the class consisting of polystyrene, polyurethane and epoxy; and preferably, the slab 43 comprises a foamed polystyrene resin having a thickness of about 3½". The deck 45 comprises a hardwood flooring, such, for example as oak; and preferably, the deck 45 comprises a layer of "Hamerloc" having a thickness of about 1¼". In passing, it is mentioned that "Hamerloc" comprises individual elongated strips of hardwood intimately cemented together edgewise with staggered joints to form a unitary board. The layers of cement 45', etc., may be of any conventional suitable type, such, for example, as epoxy cement. Accordingly, it will be understood that the floor panel 40 is of strong rigid unitary structure.

The roof panel 50 is of a construction similar to that of the floor panel 40 above described, and particular reference is made to FIGS. 3 and 5. More particularly, the roof panel 50 is of unitary composite sandwich construction including an outer metal weather sheet 51, an adjacent outer plywood sheet 52, an adjacent slab 53 of synthetic organic resin of cellular structure, an adjacent inner plywood sheet 54, and an adjacent ceiling sheet 55 of wood. More specifically, the roof panel 50 is of unitary one-piece construction from end to end thereof and from side to side thereof; the upper surface of the ceiling sheet 55 is intimately adhered to the adjacent lower surface of the plywood sheet 54 by an intervening layer of cement, indicated at 55'; the upper surface of the plywood sheet 54 is intimately adhered to the adjacent lower surface of the slab 53 by an intervening layer of cement, indicated at 54'; the upper surface of the slab 53 is intimately adhered to the adjacent lower surface of the plywood sheet 52 by an intervening layer of cement, indicated at 43'; and the upper surface of the plywood sheet 52 is intimately adhered to the adjacent lower surface of the weather sheet 51 by an intervening layer of cement, indicated at 52'.

In a constructional example of the roof panel 50, the weather sheet 51 comprises a metal selected from the class consisting of aluminum and steel (including stainless steel); and preferably, the weather sheet 51 comprises a steel sheet of 24 gauge (25.0 mils). Each of the plywood sheets 52 and 54 comprises a fir plywood having a thickness of about 5/16". The slab 53 comprises a foamed resin selected from the class consisting of polystyrene, polyurethane and epoxy; and preferably, the slab 53 comprises a foamed polystyrene resin having a thickness of about 3½". The ceiling sheet 55 comprises a fir plywood having a thickness of about ¼". The layers of cement 55', etc. may be of any conventional suitable type, such, for example, as epoxy cement. Accordingly, it will be understood that the roof panel 50 is of strong rigid unitary structure.

Each of the end wall panels 60 is of a construction similar to that of the floor panel 40 and the ceiling panel 50, above described, and particular reference is made to FIGS. 2, 3, 6 and 7. More particularly, each of the end panels 60 is of unitary composite sandwich construction including an outer metal weather sheet 61, an adjacent outer plywood sheet 62, an adjacent slab 63 of synthetic organic resin of cellular structure, an adjacent inner plywood sheet 64, an adjacent hardwood bulkhead 65, an adjacent lower kick sheet 66 (see FIGS. 2 and 6) and an adjacent upper liner sheet 67 (see FIGS. 3 and 7). More particularly, the end panel 60 is of unitary one-piece construction from top to bottom thereof and from side to side thereof; the outer surface of the lower kick sheet 66 is intimately adhered to the adjacent lower inner surface of the bulkhead 65 by an intervening layer of cement, indicated at 66'; the outer surface of the upper liner sheet 67 is intimately adhered to the adjacent upper inner surface of the bulkhead 65 by an intervening layer of cement, indicated at 67'; the outer surface of the bulkhead 65 is intimately adhered to the adjacent inner surface of the plywood sheet 64 by an intervening layer of cement, indicated at 65'; the outer surface of the plywood sheet 64 is intimately adhered to the adjacent inner surface of the slab 63 by an intervening layer of cement, indicated at 64'; the outer surface of the slab 63 is intimately adhered to the adjacent inner surface of the plywood sheet 62 by an intervening layer of cement, indicated at 63'; and the outer surface of the plywood sheet 62 is intimately adhered to the adjacent inner surface of the weather sheet 61 by an intervening layer of cement, indicated at 62'.

In a constructional example of the end panel 60, the weather sheet 61 comprises a metal selected from the class consisting of aluminum and steel (including stainless steel); and preferably, the weather sheet 61 comprises a steel sheet having a thickness of about 3/32". Each of the plywood sheets 62 and 64 comprises a fir plywood having a thickness of about 5/16". The slab 63 comprises a foamed resin selected from the class consisting of polystyrene, polyurethane and epoxy; and preferably, the slab 63 comprises a foamed polystyrene resin having a thickness of about 3". The bulkhead 65 comprises a layer of "Hamerloc" having a thickness of about 1" and of the construction previously described. The kick sheet 66 comprises a steel sheet of 9 gauge (156 mils). The liner sheet 67 comprises a hardwood sheet of hickory-pecan having a thickness of about 3/20". The layers of cement 67', etc., may be of any conventional suitable type, such, for example, as epoxy cement. Accordingly, it will be understood that each of the end panels 60 is of strong rigid unitary structure.

Each of the side panels 70 is of a construction similar to that of the end panels 60 above described; and particular reference is made to FIGS. 4, 5, 6 and 7. More particularly, each of the side panels 70 is of unitary composite sandwich construction, including an outer metal weather sheet 71, an adjacent outer plywood sheet 72, an adjacent slab 73 of synthetic organic resin of cellular structure, an adjacent inner plywood sheet 74, an adjacent lower kick sheet 75 (see FIGS. 4 and 6), and an adjacent upper liner sheet 76 (see FIGS. 5 and 7). More particularly, the side panel 70 is of unitary one-piece construction from top to bottom thereof and from side to side thereof; the outer surface of the lower kick sheet 75 is intimately adhered to the adjacent lower inner surface of the plywood sheet 74 by an intervening layer of cement, indicated at 75'; the outer surface of the upper liner sheet 76 is intimately adhered to the adjacent upper inner surface of the plywood sheet 74 by an intervening layer of cement, indicated at 76'; the outer surface of the plywood sheet 74 is intimately adhered to the adjacent inner surface of the slab 73 by an intervening layer of cement, indicated at 74'; the outer surface of the slab 73 is intimately adhered to the adjacent inner surface of the plywood sheet 72 by an intervening layer of cement, indicated at 73'; and the outer surface of the plywood sheet 72 is intimately adhered to the adjacent inner surface of the weather sheet 71 by an intervening layer of cement, indicated at 72'.

In a constructional example of the side panel 70, the weather sheet 71 comprises a metal selected from the class consisting of aluminum and steel (including stainless steel); and preferably, the weather sheet 71 comprises a steel sheet of 20 gauge (37.5 mils). Each of the plywood sheets 72 and 74 comprises a fir plywood having a thickness of about 5/16". The slab 73 comprises a foamed resin selected from the class consisting of polystyrene, polyurethane and epoxy; and preferably, the slab 73 comprises a foamed polystyrene resin having a thickness of about 3". The kick sheet 75 comprises a steel sheet of 9 gauge (156 mils). The liner sheet 76 comprises a hardwood sheet of hickory-pecan having a thickness of about 3/20". The layers of cement 75', etc., may be of any conventional suitable type, such, for example, as epoxy cement. Accordingly, it will be understood that each of the side panels 70 is of strong rigid unitary structure.

Considering now in greater detail the construction of the car body 22, the floor panel 40 is directly secured to the underframe 31 upon the top plates 121 and the outer end members 123 of the body bolsters 90, see FIG. 4. In the construction, the deck 45 of the floor panel 40 constitutes a structural diaphragm acting to distribute the floor lading thereupon substantially uniformly into the inner plywood sheet 44 and therethrough into the layer of resin 43 of cellular structure and thence through the outer plywood sheet 42 and the metal outer sheet 41 into the cross bearers, not shown, and the side sills 33, all for the purpose of transmitting the lading loading from the floor panel 40 into the underframe 31.

The side edges of the floor panel 40 are disposed laterally inwardly with respect to the upstanding flanges of the side sills 33, as shown in FIG. 4, and the end edges of the floor panel 40 are disposed longitudinally inwardly with respect to the upstanding flanges 143 of the end sills 34. The end panels 60 are arranged at the opposite ends of the floor panel 40 with the outer metal weather sheets 61 in respective engagements with the upstanding flanges 143 of the end sills 34 and with the lower ends of the end panels 60 footed upon the upper surfaces of the adjacent end portions of the outer plywood sheet 42 of the floor panel 40, see FIG. 2, whereby two laterally extending gaps are respectively provided between the lower portions of the end panels 60 and the adjacent ends of the other elements of the floor panel 40; which two laterally extending gaps mentioned are respectively filled with two laterally extending masses 170 of synthetic organic resin of cellular structure, such, for example, as foamed polyurethane. Finally, the two cracks between the opposite ends of the deck 45 of the floor panel 40 and the adjacent bulkheads 65 of the end panels 60 are respectively filled with two masses 171 of a suitable caulking compound, as shown in FIG. 2.

The side panels 70 are arranged at the opposite sides of the floor panel 40 on either side of the two previously mentioned doorways into the lading compartment 35, as shown in FIG. 1, with the outer metal weather sheets 71 in respective engagements with the upstanding flanges of the side sills 33 and with the lower ends of the side panels 70 footed upon the upper surfaces of the adjacent side portions of the outer plywood sheet 42 of the floor panel 40, as shown in FIG. 4; whereby two longitudinally extending gaps are respectively provided between the lower portions of the side panels 70 and the adjacent sides of the other elements of the floor panel 40; which two longitudinally extending gaps mentioned are filled with two longitudinally extending masses 172 of synthetic organic resin of cellular structure, such, for example, as foamed polyurethane. Finally, the two cracks between the opposite sides of the deck 45 of the floor panel 40 and the adjacent inner plywood sheets 74 of the side panels 70 are respectively filled with two masses 173 of a suitable caulking compound, as shown in FIG. 4.

Further, the car body 32 comprises, as best shown in FIGS. 6 and 7, four upstanding corner posts 175 respectively disposed at the four corners thereof, the lower end of each of the corner posts 175 being rigidly secured, as by welding, not shown, to the adjacent junction between the side sill 33 and the end sill 34 of the underframe 31. More particularly, each of the corner posts 175 is substantially W-shaped and is arranged at the corner junction between the adjacent upstanding ends of the associated end panel 60 and the associated side panel 70 and in spaced relation with respect thereto. Specifically, the corner posts 175 include two identical wings 176 that are respectively arranged substantially flush with the weather sheet 61 of the associated end panel 60 and with the weather sheet 71 of the associated side panel 70. The void between the inner surface of the corner post 175 and the adjacent ends of the elements of the end panel 60 and the side panel 70 is filled with an upstanding mass 177 of synthetic organic resin of cellular structure, such, for example, as foamed polyurethane. Finally, the crack between the kick plate 66 of the end panel 60 and the kick plate 76 of the side panel 70 and the continuing crack between the liner sheet 67 of the end panel 60 and the liner sheet 76 of the side panel 70 is filled with an upstanding mass 178 of a suitable caulking compound, as shown in FIG. 6.

In the car body 32, the roof panel 50 is directly supported upon the upper ends of the end panels 60 and the side panels 70, as best shown in FIGS. 3 and 5; and in the arrangement, the ends of the roof panel 50 are spaced longitudinally inwardly with respect to the outer weather sheets 61 of the end panels 60 and the sides of the roof panel 50 are spaced laterally inwardly with respect to the outer weather sheets 71 of the side panels 70, as best shown in FIG. 5. Accordingly, a substantially rectangular void is provided adjacent to the perimeter of the roof panel 50 and immediately above the tops of the end panels 60 and the side panels 70; which void is filled with a substantially rectangular mass 180 of synthetic organic resin of cellular structure, such, for example, as foamed polyurethane.

Further, the car body 32 comprises, as best shown in FIGS. 3 and 5, a pair of longitudinally extending and laterally spaced-apart outer side-roof corner plates 181 respectively disposed at the corner junctions between the side panels 70 and the roof panel 50 and a pair of laterally extending and longitudinally spaced-apart outer end-roof corner plates 182 respectively disposed at the corner junctions between the end panels 60 and the roof panel 50. More particularly, each of the corner plates 181 is substantially L-shaped, including a vertical flange 183 overlapping the adjacent upper portions of the metal outer weather sheets 71 of the associated pair of side panels 70 and a horizontal flange 184 overlapping the adjacent side portion of the metal outer weather sheet 51 of the roof panel 50, as best shown in FIG. 5. Similarly, each of the corner plates 182 is substantially L-shaped, including a vertical flange 185 overlapping the adjacent upper portion of the metal outer weather sheet 61 of the associated end panel 60 and a horizontal flange 186 overlapping the adjacent end portion of the metal outer weather sheet 51 of the roof panel 50, as best shown in FIG. 3. Each end of each of the corner plates 182 is cut-out to receive and to fit the respective adjacent ends of the two corner plates 181, as best shown in FIG. 1.

Further, the car body 32 comprises four upstanding outer side-end corner plates 190, as shown in FIGS. 1, 6 and 7, that are arranged at the four corner junctions between the end panels 60 and the side panels 70. More particularly, each of the corner plates 190 is substantially L-shaped, including two flanges 191 and 192 with a substantially arcuate transition section 193 therebetween. In each of the corner plates 190, the lower portions of the flanges 191 and 192 respectively overlap the adjacent ends of the side sill 33 and the end sill 34 and are rigidly secured thereto, the intermediate portions of the flanges 191 and 192 respectively overlap the adjacent ends of the outer weather sheets 71 and 61 of the respective side panel 70 and the end panel 60 and are rigidly secured thereto, and the upper portions of the flanges 191 and 192 respectively overlap the adjacent ends of the corner plates 181 and 182 and are rigidly secured thereto.

As best shown in FIG. 1, the roof panel 50 carries adjacent to the central portion thereof three laterally extending and longitudinally spaced-apart carlines 205 that serve to reinforce the top of the car body 32 adjacent to the upstanding laterally aligned doorways respectively provided between the two pairs of side panels 70 disposed at the opposite sides thereof. The opposite ends of each of the carlines 205 overlap the horizontal flanges 184 of the corner plates 181 and are rigidly secured thereto, while the intermediate portion of each of the carlines 205 is directly rigidly secured to the outer metal weather sheet 51 of the roof panel 50. Further, a longitudinally extending running board 210 is carried by the top central portion of the roof panel 50 for the general purpose of facilitating walking by a brakeman from end to end of the car 30 in the usual manner. The running board 210 may be formed of hardwood in a conventional manner, the central portion of the running board 210 being supported by the central portions of the carlines 205 and the end portions of the running board 210 being supported by a plurality of laterally extending and longitudinally spaced-apart brackets 211 disposed therebelow and also rigidly secured to the adjacent outer metal weather sheet 51 of the roof panel 50.

Referring to FIG. 1, each of the upstanding doorways provided in the central portion of each side of the car body 32 is provided with an associated heat-insulated door 80 of the exterior plug-type; and more particularly, one of the doors 80 cooperates with an associated doorframe 220 which defines a stepped door opening into the adjacent side of the lading compartment 35 when the plug door 80 occupies its open position; and the plug door 80 is mounted jointly upon a longitudinally extending upper trackway 261, and upon a longitudinally extending lower trackway 262. More specifically, the upper trackway 261 is rigidly secured to the outer side-roof corner vertical flange 183 of the outer side-roof corner plate 181 and the lower trackway 262 is suitably secured to the adjacent outer surface of the doorframe 220. In the arrangement, the upper trackway 261 is disposed above the top of the doorway, as defined by the top of the doorframe 220, and the lower trackway 262 is disposed below the bottom of the doorway, as defined by the bottom of the doorframe 220.

The plug door 80 is of conventional heat-insulated type and includes suitable guide rollers that respectively cooperate with the upper trackway 261 and with the lower trackway 262 in the usual manner, whereby the plug door 80 may be rolled longitudinally along the exterior surface of the side of the car body 32 between open and closed positions with respect to the associated doorway defined by the cooperating doorframe 220. Also, the plug door 80 carries mechanism, generally indicated at 266 in FIG. 1, that accommodates lateral movement thereof between sealed and unsealed positions with respect to the associated doorway defined by the cooperating doorframe 220 when the plug door 80 occupies its closed position in generally covering relation with respect to the associated doorway. The mechanism 266 is entirely conventional and is selectively operative by an associated handle, indicated at 267 in FIG. 1; whereby the plug door 80 may be readily actuated between its sealed and unsealed positions with respect to the associated doorway, when it occupies its covering position with respect thereto. Also, the plug doorway 80 may be rolled longitudinally upon the trackways 261 and 262 into its entirely open position with respect to the associated doorway, so as to accommodate ready access through the doorway into the adjacent side of the lading compartment 35.

In a constructional example of the railway car 30: the length of the lading compartment 35 between the kick plates 66 of the end panels 60 is 50 ft.; the width of the lading compartment 35 between the kick plates 75 of the side panels 70 is 9 ft. 6 in.; the height of the lading compartment 35 between the top of the deck 45 of the floor panel 40 and the bottom of the ceiling sheet 55 of the roof panel 50 is 9 ft. 9 in.; the overall longitudinal distance between the metal outer weather sheets 61 of the end panels 60 is approximately 50 ft. 9 11/16 in.; the overall lateral distance between the metal outer weather sheets 71 of the side panels 70 is approximately 10 ft. 1 7/8 in.; the distance between the striker plates 116 carried by the opposite ends of the floating center sill 92 is approximately 55 ft. 8 1/4 in.; the total longitudinal travel of the floating center sill 92 relative to the underframe 31 is approximately 20 in.; and the total longitudinal travel of each of the car couplers 118 relative to the floating center sill 92 that is accommodated by the associated draft gear is approximately 2 3/4 in.

In this constructional example, the railway car 30 has a lightweight (unloaded) of approximately 54,000#, a lading capacity of 115,000#, and a rail weight (loaded) of 169,000#. Of the lightweight of 54,000# of this car, the car body 32 has a weight of only 20,000#, the two trucks together have a weight of 15,000#, and the underframe 31 and all of the other gear have a weight of 19,000#. Of this 19,000#, the center sill 92 has a weight of 4,800#, the Waugh cushioning equipment has a weight of 2,600#, and the two car couplers 118 together have a weight of 1,800#; whereby the underframe 31 proper together with the remainder of the miscellaneous gear (brake equipment, etc.) have a weight of only 9,800#.

Thus it will be appreciated that the car body 32 formed from the panels 40, 50, 60 and 70 and the underframe 31 proper are of exceedingly lightweight in the railway car 30 of this lading capacity and of this relatively large size. Moreover, this lightweight of 54,000# in a 50 ft. heat-insulated railway box car is altogether unusual and totally beyond comparison with conventional such railway cars of comparable capacity.

In the foregoing description of the heat-insulated railway box car 30, it is noted that where the composition of a structural element is not particularly specified, the same is formed of a suitable conventional material, and ordinarily of an appropriate steel. Thus, the side sills 31, the end sills 34, the various corner plates 181, 182 and 190, together with the floating center sill 92, etc., are formed of appropriate steels, in a conventional manner.

Considering now the general mode of assembly of the railway car 30 and the general sequence of the fabricating steps involved therein, it is first noted that the individual panels 40, 50, 60 and 70, as well as the plug doors 80, are prefabricated on suitable factory production lines entirely independent of the ultimate assembly of the railway car 30. The floor panel 40 is then laid down in an inverted position upon a suitable support and the side sills 33, the body bolsters 90, the end sills 34, the floating center sill 92, the brake rigging, not shown, the Waugh cushioning equipment, and the draft attachments are assembled in proper relation. Then the car couplers 118 are assembled in the opposite outer ends of the floating center sill 92 and respectively connected to the associated draft gears. Then the body bolsters 90 are finalized and the cross bearers are applied and integrated into the underframe 31, together with the load transfer plates 130.

At this time, the whole of the underframe 31 is completed; whereupon this subassembly is removed from the support mentioned and inverted; and the body bolsters are placed upon the truck bolsters of the two associated trucks arranged upon a cooperating railway track. The four corner posts 175 are erected and welded in place with respect to the underframe 31. The side panels 70 and the end panels 60 are set up with reference to the respective side sills 33 and end sills 34. Then the roof panel 50 is set down upon the top edges of the end panels 60 and the side panels 70. The outer side-roof corner plates 181 and the outer end-roof corner plates 181 and the outer end-roof corner plates 182 are applied and then the outer side-end plates 190 are applied. The doorframes 220 are then set in the opposite sides of the body 32 to frame the doorways thereinto. At this time, the polyurethane masses 170, 172, 177 and 180 are blown in place. In this connection, it is noted that appropriate openings or holes are provided in the horizontal flanges of the corner plates 181 and 182 in order to accommodate the reception of the foamed polyurethane. Then the various cracks are caulked, including the application of the various masses of caulking material 171, 173, 178, etc.

The door tracks 261 and 262 are set and secured in place, and the plug doors 80 are applied and rigged. The railway car 30 is then finished by the application of the various attachments including the running board 210, the various grab irons, etc.; and ultimately, the exterior surfaces of at least the roof panel 50, the end panels 60 and the side panels 70 are painted in order to give the railway car 30 a finished appearance.

In applying the side sills 33 to the floor panel 40, a cementing procedure is employed; and specifically, a suitable epoxy resin cement is utilized. The cement is applied in liquid form to the surfaces of the elements of the side sills 33 and allowed partially to set up; and while the cement is still in a tacky condition, the side sills 33 are applied to the floor panel 40. Similarly, the end sills 34 are applied to the floor panel 40. Also, the end panels 60 and the side panels 70 are cemented in place with respect to the end sills 34 and the side sills 33, in a like manner.

In connection with the applications of the outer side-roof corner plates 181 and the outer end-roof corner plates 182 to the car body 32, it has been found advantageous initially to utilize a cementing procedure prior to the setting of any associated fasteners. More particularly, a layer of adhesive is applied to the inner surfaces of the flanges 183 and 184 of each of the outer side-roof corner plates 181, and then the flanges of the two plates 181 are pressed in position with respect to the outside corner junctions between the upper portions of the side panels 70 and the adjacent side portions of the roof panel 50. Again, a suitable epoxy resin adhesive is employed; and in utilizing the same, it is applied in liquid form to the interior surfaces of the flanges 183 and 184 of the corner plate 181. This same procedure is recommended in applying the outer end-roof corner plates 182 and in applying the pair of doorframes 220 to the car body 32, in the manner previously described.

This procedure insures proper placement and alignment of the corner plates 181 and 182 and of the doorframes 220 with respect to the other elements of the car body 32 and also serves at least partially to maintain these elements in their finally assembled relation, although, of course, the other fastening devices that are utilized serve the fundamental function of securing together the cooperating elements mentioned in the car body 32.

The various panels 40, 50, 60 and 70 are all of rigid unitary sandwich structure and are of block-like configuration; whereby each such block-like panel, by definition, has three dimensions respectively extending along the three coordinate axes thereof and in the three corresponding directions. Thus, each panel has a substantial length of a value (X) extending along the $x$-axis and in the $x$ direction, a substantial width of a value (Y) extending along the $y$-axis and in the $y$ direction, and a substantial thickness of a value (Z) extending along the $z$-axis and in the $z$ direction. More particularly, each panel constructed in accordance with the present invention has a length and a width each of at least seven feet and many of the panels have substantially greater lengths and widths; and each of the panels has a thickness of several inches; all as has been explained above. Each of the panels further comprises an outer weather sheet of metal, a first sheet of plywood intimately adhered to the inner surface of the weather sheet, a slab of synthetic organic plastic resin of rigid cellular structure intimately adhered to the inner surface of the first plywood sheet, a second sheet of plywood intimately adhered to the inner surface of the slab, and a liner sheet intimately adhered to the inner surface of the plywood sheet. The first plywood sheet in all cases is of composite construction including a number of individual plywood sections cemented together in abutting edge relationship to provide first joints therebetween, each of the first plywood sheet sections extending in the $y$ direction of the panel and having a length of substantially Y with the first joints extending substantially parallel to each other and in the $y$ direction. The slab of each of the panels is also of composite construction including a number of individual block-like sections cemented together in abutting edge relationship to provide second joints therebetween, each of the slab sections extending in the $y$ direction of the panel and having a length of substantially Y with the second joints extending substantially parallel to each other and in the $y$ direction. The second plywood sheet likewise is of composite construction including a number of individual plywood sections cemented together in abutting edge relationship to provide third joints therebetween, each of the second plywood sheet sections extending in the $y$ direction of the panel and having a length of substantially Y with the third joints extending substantially parallel to each other and in the $y$ direction. The widths of the various sections of the plywood sheets and the slab and the arrangements of the joints therein is such that the first and second and third joints are mutually offset with respect to each other in the $z$ direction through the thickness of the panel, thus to provide an unusually strong construction.

Considering now the actual constructional arrangement of the floor panel 40, and referring to FIGS. 8 to 12, inclusive, it will be observed that the outer metal weather sheet 41 comprises complementary sections $41a$, $41b$ and $41c$ arranged in a first row extending the length X of the panel 40 and having a width equal substantially to one-half of the width thereof, and complementary sections $41d$, $41e$ and $41f$ arranged in a second row extending the length of the panel 40 and having a width equal substantially to one-half of the width thereof. Each panel is joined to the adjacent panel in its row by a seam $41y$ and each panel is joined to adjacent panels in the other row along a seam $41x$, the panels being joined along the seams by the utilization of a plurality of fasteners, such as the screws 49, whereby the outer weather sheet 41 is continuous from side to side of the floor panel 40.

The outer plywood sheet 42 comprises eleven inner sections $42a$, each of substantially rectangular configuration and having the same width and having a length equal substantially to the Y dimension of the floor panel 40. Two outer sections $42b$ are provided, the sections $42b$ also being of substantially rectangular configuration having a width less than that of the sections $42a$ and having a length equal substantially to the Y dimension of the floor panel 40. The adjacent edges of all of the sections $42a$ and $42b$ are disposed in abutting relation and are securely cemented together, as indicated at $42y$.

The slab 43 comprises twenty-five sections $43a$, each of substantially rectangular configuration and having substantially the same width and a length equal substantially to the Y dimension of the floor panel 40. The abutting edges between the sections $43a$ are securely cemented as indicated at $43y$.

The inner plywood sheet 44 comprises twelve complementary sections $44a$, each of substantially rectangular configuration and having substantially the same width and a length equal substantially to the Y dimension of the floor panel 40; a pair of end sections $44a$ is also provided, each of substantially rectangular configuration, and having widths substantially less than the width of the sections $44a$ and a length equal substantially to the Y dimension of the floor panel 40. The adjacent edges of the sections $44a$ and $44b$ are disposed in abutting relation and are securely cemented together as at $44y$. The width of the sections $44a$ are substantially equal to the width of the sections $42a$ described above but the width of the sections $42b$ are substantially less than the width of the sections $42a$; which arrangement is utilized for the purpose of particularly locating the seams or joints $42y$ and $44y$, as explained more fully hereinafter.

The liner sheet in the case of the floor panel 40 is a deck 45 of hardwood comprising a layer of "Hamerloc" comprising individual elongated strips $45a$ of hardwood intimately cemented together edgewise with staggered joints to form a unitary board, as has been explained herebefore.

By virtue of the particular locations of the seams or junctions 42y of the outer plywood sheet 42, and by virtue of the particular locations of the seams or junctions 43y between the sections 43a of the slab 43, and by virtue of the particular locations of the seams or junctions 44y of the inner plywood sheet 44, all of the junctions 42y, 43y and 44y are mutually staggered with respect to each other through the thickness of the floor panel 40 thereby to lend greater strength to the composite construction thereof. More specifically, a seam 42y lying on the vertical line 48a of FIG. 12 is not in alignment with any of the seams 43y or 44y, and a seam 43y lying on the vertical line 48b is not in alignment with any of the seams 42y or 44y, and a seam 44y lying on the vertical line 48c is not in alignment with any of the seams 42y or 43y, thereby to lend greater strength to the composite construction thereof. Furthermore, the various longitudinal seams in the weather sheet 41 and the deck 45 do not overlap any such seams in the plywood sheets 42 and 44 or the slab 43.

In view of the foregoing, it will be appreciated that the floor panel 40 is so constructed and arranged that there is no substantial overlapping of the longitudinal or lateral seams in the component elements 41, 42, 43, 44 and 45 thereof through the thickness of the floor panel 40, thereby to lend greater strength and rigidity to the composite construction of the unitary floor panel 40.

Considering now the actual constructional arrangement of the ceiling panel 50 and referring to FIGS. 13 to 17, inclusive, it will be observed that the outer metal weather sheet 51 comprises a first row of sections 51a, 51b and 51c extending the length of the ceiling panel 50 and having a width substantially equal to one-half the width of the ceiling panel 50. A second row of sections 51d, 51e and 51f is provided also extending substantially the entire length of the ceiling panel 50 and having a width equal substantially to one-half of the width thereof. Each of the sections is securely fastened to the adjacent section in its own row and to the adjacent section in the adjacent row along seams 51y and 51x, respectively, the sections being secured together by the utilization of a plurality of fasteners, such as the screws 59; whereby the weather sheet 51 is continuous from side to side of the ceiling panel 50.

The outer plywood sheet 52 comprises a first group of sections 52a, there being twelve of the sections 52a all of equal width and having lengths substantially equal to the Y dimension of the ceiling panel 50. Two outer panel sections 52b are provided at the ends, each of the panel sections 52b having a width less than the width of a panel section 52a and preferably equal to each other and having lengths equal substantially to the Y dimension of the ceiling panel 50. The adjacent edges of the sections 52a and 52b are disposed in abutting relation and are securely cemented together, as indicated at 52y.

The slab 53 comprises twenty-one sections 53a that are substantially equal in width and having lengths substantially equal to the Y dimension of the ceiling panel 50. Three additional sections 53b are provided at each end of the sections 53a, all of the sections 53b having substantially the same width which is less than the width of the sections 53a and all having a length substantially equal to the Y dimension of the ceiling panel 50. The abutting edges between the sections 53a and 53b are securely cemented, as indicated at 53y.

The inner plywood sheet 54 comprises eleven inner sections 54a having substantially equal widths and lengths substantially equal to the Y dimension of the ceiling panel 50, and two outer end sections 54b having substantially equal widths less than the width of an inner section 54a and having lengths substantially equal to the Y dimension of the ceiling panel 50. The adjacent edges of the sections 54a and 54b are disposed in abutting relation and are securely cemented together, as indicated at 54y.

The inside or liner plywood sheet 55 comprises ten inner sections 55a all having substantially the same width and a length equal substantially to the Y dimension of the ceiling panel 50. Arranged adjacent to each of the outermost sections 55a is a second section 55b, the sections 55b having equal widths substantially less than the width of a section 55a and having lengths equal substantially to the Y dimension of the ceiling panel 50. Disposed respectively adjacent to the outer edges of the panel sections 55b are two panel sections 55c which are equal in width, the width thereof being less than the width of the panel sections 55b, and which have a length equal substantially to the Y dimension of the ceiling panel 50. The adjacent edges of all of the sections 55a, 55b and 55c are disposed in abutting relation and are securely cemented together, as indicated at 55y.

Figure 17:
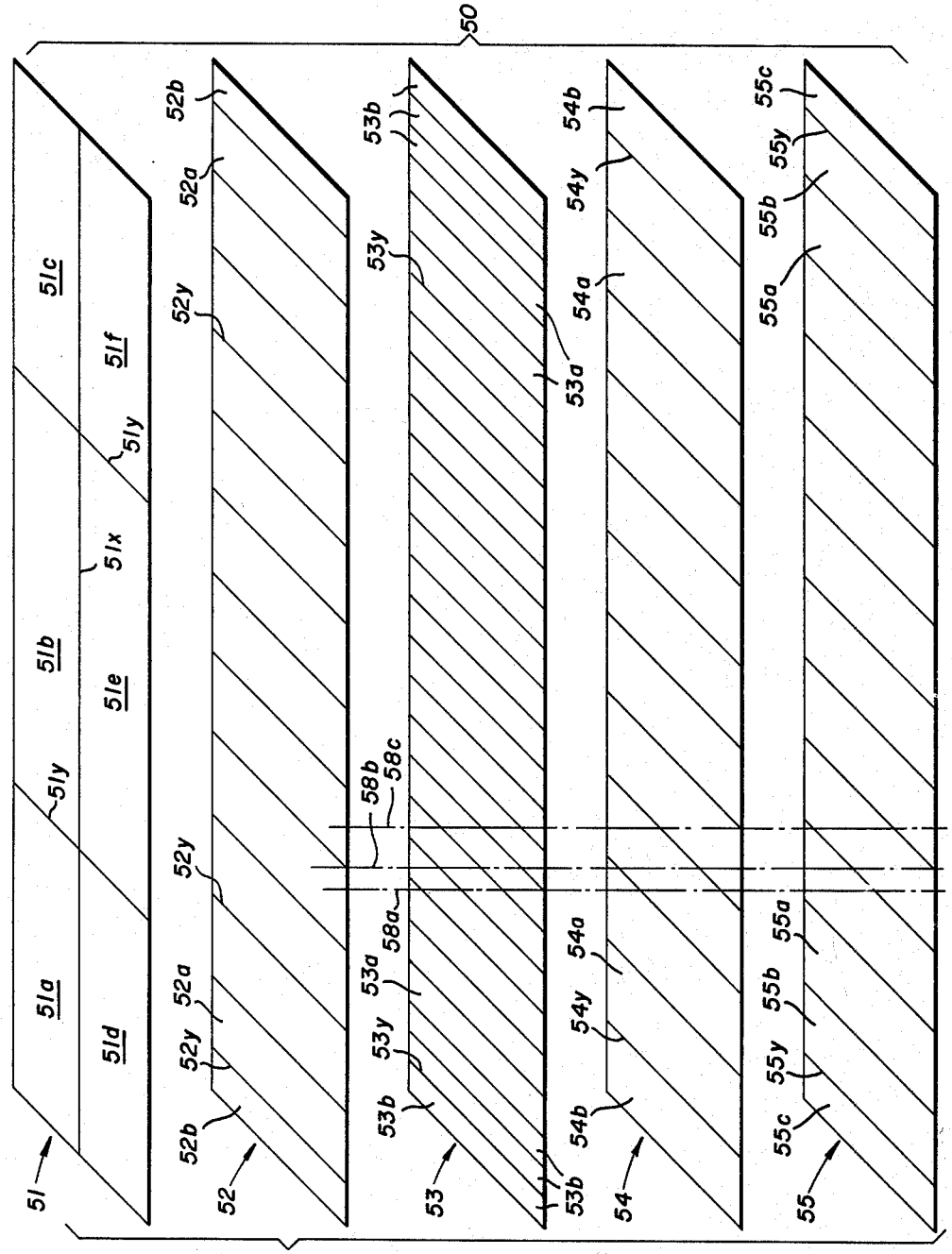
FIG. 17 is an exploded diagrammatic perspective view of the various plies of material that are incorporated in the ceiling panel of FIGS. 13 to 16, inclusive.
Figure 18:
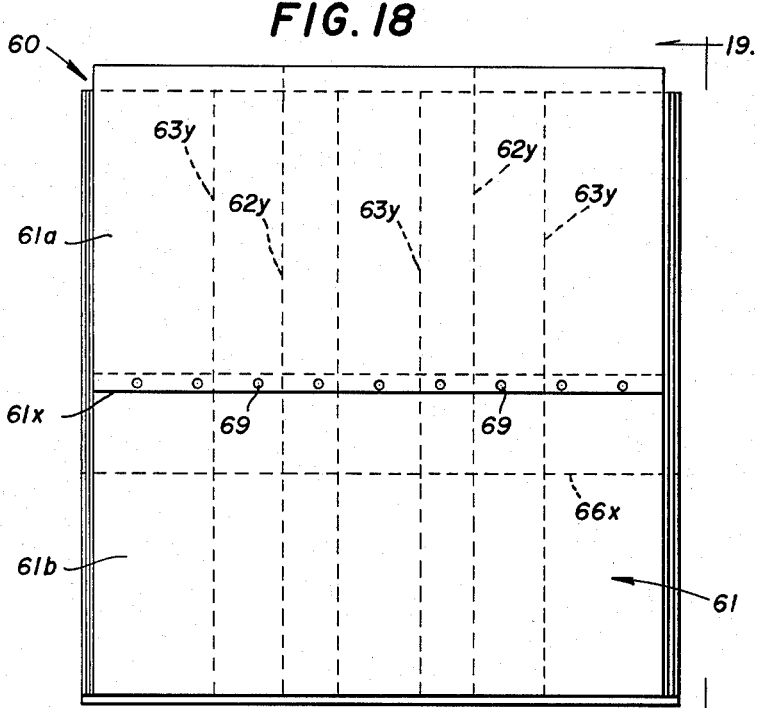
FIG. 18 is a front or outside elevational view of one of the end wall panels.
Figure 19:
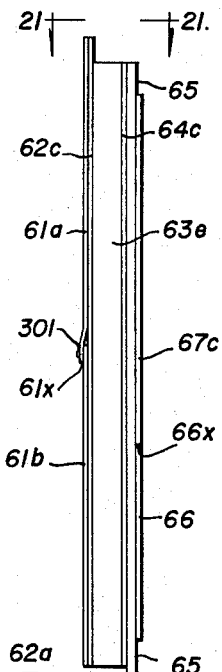
FIG. 19 is a side elevational view of the end wall panel of FIG. 18.
Figure 20:
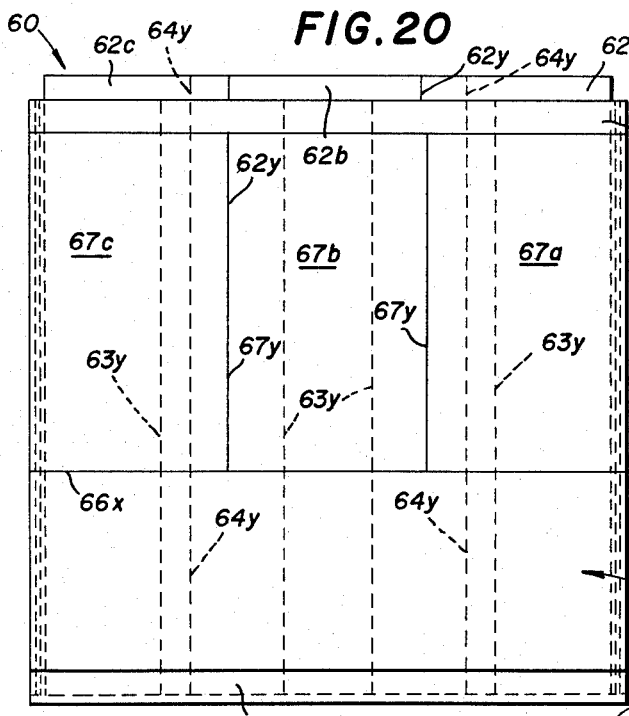
FIG. 20 is a rear or inside elevational view of the end wall panel of FIGS. 18 and 19.
Figure 21:
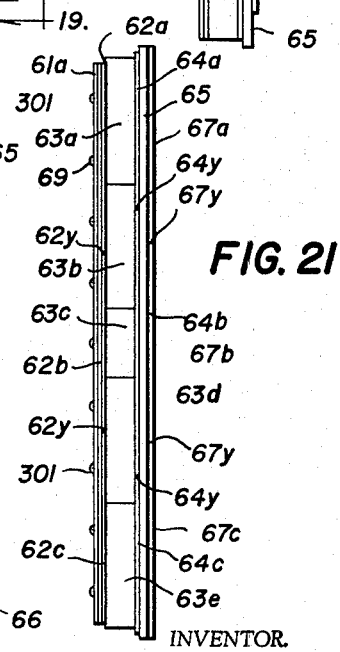
FIG. 21 is a top view of the end wall panel of FIGS. 18, 19 and 20.

By virtue of the particular locations of the seams or junctions 52y between the sections 52a and 52b of the outer plywood sheet 52, and by virtue of the particular locations of the seams or junctions 53y between the sections 52a and 53b of the slab 53, and by virtue of the particular locations of the seams or junctions 54y between the sections 54a and 54b of the inner plywood sheet 54, and by virtue of the particular locations of the seams or junctions 55y between the sections 55a, 55b and 55c of the liner plywood sheet 55, the junctions 52y, 53y, 54y and 55y are mutually staggered with respect to each other through the thickness of the ceiling panel 50, thereby to lend greater strength to the composite construction thereof. More specifically, a junction 53y such as that lying along the vertical line 58a in FIG. 17 is not in alignment with any of the junctions 52y, 54y or 55y; also a junction 52y lying on a vertical line 58b is not in alignment with any of the junctions 53y or 54y; likewise, a junction 54y lying on the vertical line 58c is not in alignment with any of the junctions 52y, 53y or 55y.

In view of the foregoing, it will be appreciated that the ceiling panel 50 is so constructed and arranged that there is no substantial overlapping of the horizontal or vertical seams in the component elements 51, 52, 53, 54 and 55 thereof through the thickness of the ceiling panel 50, whereby to lend greater strength and rigidity to the composite constructions of the unitary ceiling panel 50.

Considering now the actual constructional arrangement of one of the end wall panels 60 and referring to FIGS. 18 to 22, inclusive, it will be observed that the outer metal weather sheet 61 comprises complementary upper and lower sections 61a and 61b that are seamed together, as indicated at 61x, the bottom of the upper section 61a overlying the top of the lower section 61b, and the seam 61x being secured by the utilization of a plurality of fasteners, such as the screws 69; whereby each of the sections 61a and 61b is continuous from side to side of the end panel 60. The upper liner sheet 67 comprises three complementary sections 67a, 67b and 67c, each of substantially rectangular configuration, the adjacent edges of the sections 67a, 67b and 67c being disposed in abutting relation and securely cemented together, as indicated at 67y in FIG. 22. The lower kick sheet 66 is of one-piece construction from side to side of the end panel 60, the bottom edges of the sections 67a, 67b and 67c of the upper liner sheet 67 being disposed in abutting relation with the top edge of the lower kick sheet 66 and securely cemented together, as indicated at 66x.

The inside plywood sheet 64 comprises three complementary sections 64a, 64b and 64c, each of substantially rectangular configuration, the adjacent edges of the sections 64a, 64b and 64b, 64c being disposed in abutting relation and securely cemented together, as indicated at 64y. The three sections 64a, 64b and 64c are of one-piece construction from top to bottom of the end panel 60; the two sections 64a and 64c are identical and each is of a width that is narrower than that of the central section 64b; which arrangement is utilized for the purpose of particularly locating the seams or joints 64y, as explained more fully hereinafter.

The outside plywood sheet 62 comprises three complementary sections 62a, 62b and 62c, each of substantially rectangular configuration; the adjacent edges of the sections 62a, 62b and 62b, 62c being disposed in abutting relation and securely cemented together, as indicated at 62y. The three sections 62a, 62b and 62c are of one-piece construction from top to bottom of the end panel 60; and all three of the sections 62a, 62b and 62c are identical and each is of the same width for the purpose of particularly locating the seams or joints 62y, as explained more fully hereinafter.

The slab 63 comprises five complementary sections 63a, 63b, 63c, 63d and 63e, each of substantially rectangular configuration. The abutting edges between the sections 63a, 63b and the sections 63b and 63c and the sections 63c, 63d and the sections 63d and 63e are securely cemented, as indicated at 63y. The five sections 63a, 63b, 63c, 63d and 63e are of one-piece construction from top to bottom of the end panel 60; and the four sections 63a, 63b, 63d and 63e have the same width that is wider than that of the section 63c for the purpose of particularly locating the vertical seams or junctions 63y, as explained more fully hereinafter.

By virtue of the particular locations of the seams or junctions 64y between the sections 64a, 64b and 64c of the inner plywood sheet 64, and by virtue of the particular locations of the seams or junctions 62y between the sections 62a, 62b and 62c of the outer plywood sheet 62, the junctions 64y are staggered with respect to the junctions 64y are staggered with respect to the junctions 62y through the thickness of the end panel 60, thereby to lend great strength to the composite construction thereof. Also, by virtue of the locations of the seams or junctions 63y between the various sections of the slab 63 with respect to the locations of the seams or junctions 64y and 62y, explained above, the junctions 63y are staggered with respect to both the junctions 64y and 62y through the panel 60, thereby to lend great strength in the composite construction thereof. More particularly, the four junctions 63y lying on the horizontal lines 68a, 68b, 68c and 68d, respectively, in FIG. 22 are not in alignment with any of the junctions 62y or 64y.

As previously explained, the bulkhead 65 that is incorporated in the end panel 60 is of fabricated construction formed of "Hamerloc" so that the various horizontal and vertical seams between the great multiplicity of sections thereof are generally disposed in non-overlapping relation with respect to the various seams in the elements 62, 63 and 64, as described above.

In view of the foregoing, it will be appreciated that the end panel 60 is so constructed and arranged that there is no substantial overlapping of the horizontal or vertical seams in the component elements 61, 62, 63, 64, 65, 66 and 67 thereof through the thickness of the end panel 60, thereby to lend great strength and rigidity to the composite construction of the unitary end panel 60.

Considering now the actual constructional arrangement of one of the side wall panels 70, and referring to FIGS. 23 to 27, inclusive, it will be observed that the outer metal weather sheet 71 comprises complementary upper and lower sections 71a and 71b that are seamed together, as indicated at 71, the bottom of the upper section 71a overlying the top of the lower section 71b, and the seam 71 being secured by the utilization of a plurality of fasteners, such as the screws 79; whereby each of the sections 71a and 71b is continuous from side to side of the end side panel 70. The upper liner sheet 76 comprises six complementary sections 76a, 76b, 76c, 76d, 76e and 76f, each of substantially rectangular configuration, the adjacent edges of the sections being disposed in abutting relation and securely cemented together, as indicated at 67y. The five sections 76a, 76b, 76c, 76d and 76e have substantially the same width and the section 76f has a width substantially less than that of the other sections; which arrangement is utilized for the purpose of particularly locating the seams or joints 76y, as explained more fully hereinafter. The lower kick sheet 75 comprises three complementary sections 75a, 75b and 75c, each of substantially rectangular configuration, the adjacent edges of the sections being disposed in abutting relation and securely cemented together. The bottom edges of the sections 76a, 76b, 76c, 76d, 76e and 76f of the upper liner sheet 76 are disposed in abutting relation with the top edges of the lower kick sheet sections 75a, 75b and 75c and are securely cemented together, as indicated at 75x.

The inner plywood sheet 75 comprises six complementary sections 74a, 74b, 74c, 74d, 74e and 74f, each of substantially rectangular configuration, the adjacent edges of the sections being disposed in abutting relation and securely cemented together, as indicated at 74y. The sections are all of one-piece construction from top to bottom of the side panel 70 and have a length equal substantially to the Y dimension thereof. The four sections 74b, 74c, 74d and 74e are identical and each has a width that is greater than that of the outer sections 74a and 74f, which arrangement is utilized for the purpose of particularly locating the seams or joints 74y, as explained more fully hereinafter.

The slab 73 comprises nine inner sections 73a each of substantially rectangular configuration and having equal widths and of one-piece construction extending from top to bottom of the side panel 70 and having a length equal substantially to the Y dimension thereof. Two narrower sections 73b are provided on the outer ends, the sections 73b also being of one-piece construction from top to bottom of the side panel 70 and having a length equal substantially to the Y dimension thereof. The adjacent edges of all of the sections 73a and 73b are disposed in abutting relation and securely cemented together, as indicated at 73y.

The outer plywood sheet 72 comprises five complementary sections 72a, 72b, 72c, 72d and 72e, each of substantially rectangular configuration; the adjacent edges of the sections being disposed in abutting relation and securely cemented together, as indicated at 72y. All of the sections are of one-piece construction extending from top to bottom of the side panel 70 and have a length equal substantially to the Y dimension thereof, each section being of the same width for the purpose of particularly locating the seams or junctions 72y, as explained more fully hereinafter.

By virtue of the particular locations of the seams or junctions 72y between the sections of the inner plywood sheet 72, and by virtue of the particular locations of the seams or junctions 73y between the sections of the slab 73, and by virtue of the particular locations of the seams or junctions 74y between the sections of the inner plywood sheet 74, and by virtue of the particular locations of the seams or junctions 75y and 76y of the liner sheet, all of the junctions are mutually staggered with respect to each other through the thickness of the side panel 70, thereby to lend greater strength to the composite construction thereof. More specifically, the junctions 73y lying on the horizontal lines 78a and 78b and 78c in FIG. 7, for example, are not in alignment with any of the seams or junctions 72y, 74y, 75y or 76y.

In view of the foregoing, it will be appreciated that the side panel 70 is so constructed and arranged that there is no substantial overlapping of the horizontal or vertical seams in the component elements 71, 72, 73, 74, 75 and 76 thereof through the thickness of the side panel 70 thereby to lend great strength and rigidity to the composite construction of the unitary side panel 70.

In view of the foregoing, it is apparent that there has been provided prefabricated heat-insulating panels of improved and simplified construction and arrangement which fulfill all of the objects and advantages set forth above.

While there have been described what are at present considered to be the preferred embodiments of the invention, it will be understood that various modifications may be made therein, and it is intended to cover in the

What is claimed is:

1. A prefabricated heat-insulating and self-supporting panel of rigid unitary sandwich structure comprising a first sheet of plywood, a slab of synthetic organic resin of rigid cellular structure intimately adhered to the inner surface of said first plywood sheet, a second sheet of plywood intimately adhered to the inner surface of said slab, said panel being of block-like configuration and having a substantial length (X) and a substantial width (Y) and a thickness (Z); said first plywood sheet being of composite construction including a number of individual sections cemented together in abutting edge relationship to provide first joints therebetween, each of said first plywood sheet sections extending in the y direction of said panel and having a length of substantially Y, said first joints extending substantially parallel to each other and in the y direction of said panel; said slab being of composite construction including a number of individual block-like sections cemented together in abutting edge relationship to provide second joints therebetween, each of said slab sections extending in the y direction of said panel and having a length of substantially Y, said second joints extending substantially parallel to each other and in the y direction of said panel; said second plywood sheet being of composite construction including a number of individual sections cemented together in abutting edge relationship to provide third joints therebetween, each of said second plywood sheet sections extending in the y direction of said panel and having a length of substantially Y, said third joints extending substantially parallel to each other and in the y direction of said panel; said first and second and third joints being mutually offset with respect to each other in the z direction through said panel.

2. The prefabricated heat-insulating panel set forth in claim 1, and further comprising an outer weather sheet of metal intimately adhered to the outer surface of said first plywood sheet, and a liner sheet intimately adhered to the inner surface of said second plywood sheet.

3. The prefabricated heat-insulating and self-supporting panel set forth in claim 2, wherein said outer weather sheet essentially comprises a metal selected from the class consisting of steel and aluminum, and said slab consists essentially of foamed polystyrene.

4. The prefabricated heat-insulating and self-supporting panel set forth in claim 2, wherein said outer weather sheet has a thickness of the order of 25 to 100 mils, each of said plywood sheets has a thickness of about ¼ inch, said slab has a thickness of several inches, and said liner sheet has a thickness of at least about 150 mils.

5. The prefabricated heat-insulating and self-supporting panel set forth in claim 1, wherein said slab consists essentially of foamed polystyrene and has a thickness of several inches, and each of said plywood sheets has a thickness of about ¼ inch.

6. A prefabricated heat-insulating and self supporting floor panel of rigid unitary sandwich structure comprising an outer weather sheet of metal, a first sheet of plywood intimately adhered to the inner surface of said weather sheet, a slab of synthetic organic resin of rigid cellular structure intimately adhered to the inner surface of said first plywood sheet, a second sheet of plywood intimately adhered to the inner surface of said slab, and a deck intimately adhered to the inner surface of said second plywood sheet, said floor panel being of block-like configuration and having a substantial length (X) and a substantial width (Y) and a thickness (Z); said first plywood sheet being of composite construction including a number of individual sections cemented together in abutting edge relationship to provide first joints therebetween, each of said first plywood sheet sections extending in the y direction of said floor panel and having a length of substantially Y, said first joints extending substantially parallel to each other and in the y direction of said floor panel; said slab being of composite construction including a number of individual block-like sections cemented together in abutting edge relationship to provide second joints therebetween, each of said slab sections extending in the y direction of said floor panel and having a length of substantially Y, said second joints extending substantially parallel to each other and in the y direction of said floor panel; said second plywood sheet being of composite construction including a number of individual sections cemented together in abutting edge relationship to provide third joints therebetween, each of said second plywood sheet sections extending in the y direction of said floor panel and having a length of substantially Y, said third joints extending substantially parallel to each other and in the y direction of said floor panel; said first and second and third joints being mutually offset with respect to each other in the z direction through said floor panel.

7. The prefabricated heat-insulating and self-supporting floor panel set forth in claim 6, wherein said weather sheet essentially comprises a metal selected from the class consisting of steel and aluminum, said slab consists essentially of foamed polystyrene, and said deck consists essentially of hardwood flooring.

8. The prefabricating heat-insulating and self-supporting panel set forth in claim 7, wherein said weather sheet has a thickness of the order of 25 mils, each of said plywood sheets has a thickness of about ¼ inch, said slab has a thickness of several inches, and said deck has a thickness of at least about 1 inch.

9. The prefabricated heat-insulating and self-supporting floor panel set forth in claim 6, wherein said weather sheet further includes a number of individual sections each having a length less than X and a width equal substantially to Y/2, and a plurality of screws securing said weather sheet sections together in overlapping edge relationship.

10. The prefabricated heat-insulating and self-supporting floor panel set forth in claim 6, wherein said deck constitutes a structural diaphragm acting to distribute the floor loading thereupon substantially uniformly into said second plywood sheet disposed immediately thereagainst.

11. A prefabricated heat-insulating and self-supporting ceiling panel of rigid unitary sandwich structure comprising an outer weather sheet of metal, a first sheet of plywood intimately adhered to the inner surface of said weather sheet, a slab of synthetic organic resin of rigid cellular structure intimately adhered to the inner surface of said first plywood sheet, a second sheet of plywood intimately adhered to the inner surface of said slab, and a ceiling sheet of plywood intimately adhered to the inner surface of said second plywood sheet, said ceiling panel being of block-like configuration and having a substantial length (X) and a substantial width (Y) and a thickness (Z); said first plywood sheet being of composite construction including a number of individual sections cemented together in abutting edge relationship to provide first joints therebetween, each of said first plywood sheet sections extending in the y direction of said ceiling panel and having a length of substantially Y, said first joints extending substantially parallel to each other and in the y direction of said ceiling panel; said slab being of composite construction including a number of individual block-like sections cemented together in abutting edge relationship to provide second joints therebetween, each of said slab sections extending in the y direction of said ceiling panel and having a length of substantially Y, said second joints extending substantially parallel to each other and in the y direction of said ceiling panel; said second plywood sheet being of composite construction including a number of individual sections cemented together in abutting edge relationship to provide third joints therebetween, each of said second plywood sheet sections extending in the y direction of said ceiling panel and having a length of substantially Y, said third joints extending substantially parallel to each other and in the y direction of said ceiling panel; said first and second and third joints being mutually offset with respect to each other in the z direction through said ceiling panel.

12. The prefabricated heat-insulating and self-supporting ceiling panel set forth in claim 11, wherein said ceiling sheet is of composite construction including a number of individual sections cemented together in abutting edge relationship to provide fourth joints therebetween, each of said ceiling sheet sections extending in the y direction of said ceiling panel and having a length of substantially Y, said fourth joints extending substantially parallel to each other and in the y direction of said ceiling panel, said fourth joints also being mutually offset with respect to said first and second and third joints in the z direction through said ceiling panel.

13. The prefabricated heat-insulating and self-supporting ceiling panel set forth in claim 11, wherein said weather sheet essentially comprises a metal selected from the class consisting of steel and aluminum, and said slab consists essentially of foamed polystyrene.

14. The prefabricated heat-insulating and self-supporting ceiling panel set forth in claim 13, wherein said weather sheet has a thickness of the order 25 mils, said first plywood sheet and said second plywood sheet and said ceiling sheet each has a thickness of about ¼ inch, and said slab has a thickness of several inches.

15. The prefabricated heat-insulating and self-supporting ceiling panel set forth in claim 11, wherein said weather sheet further includes a number of individual sections each having a length less than X and a width equal substantially to Y/2, and a plurality of screws securing said weather sheet sections together in overlapping edge relationship.

16. A prefabricated heat-insulating and self-supporting end wall panel of rigid unitary sandwich structure comprising, an outer weather sheet of metal, a first sheet of plywood intimately adhered to the inner surface of said weather sheet, a slab of synthetic organic resin of rigid cellular structure intimately adhered to the inner surface of said first plywood sheet, a second sheet of plywood intimately adhered to the inner surface of said slab, a bulkhead of hardwood intimately adhered to the inner surface of said second plywood sheet, and a liner sheet intimately secured to the inner surface of said bulkhead, said panel being of block-like configuration and having a substantial length (X) and a substantial width (Y) and a thickness (Z); said first plywood sheet being of composite construction including a number of individual sections cemented together in abutting edge relationship to provide first joints therebetween, each of said first plywood sheet sections extending in the y direction of said end wall panel and having a length of substantially Y, said first joints extending substantially parallel to each other and in the y direction of said end wall panel; said slab being of composite construction including a number of individual block-like sections cemented together in abutting edge relationship to provide second joints therebetween, each of said slab sections extending in the y direction of said end wall panel and having a length of substantially Y, said second joints extending substantially parallel to each other and in the y direction of said end wall panel; said second plywood sheet being of composite construction including a number of individual sections cemented together in abutting edge relationship to provide third joints therebetween, each of said second plywood sheet sections extending in the y direction of said end wall panel and having a length of substantially Y, said third joints extending substantially parallel to each other and in the y direction of said end wall panel; said first and second and third joints being mutually offset with respect to each other in the z direction through said end wall panel.

17. The prefabricated heat-insulating and self-supporting end wall panel set forth in claim 16, wherein said liner sheet consists essentially of metal.

18. The prefabricated heat-insulating and self-supporting end wall panel set forth in claim 16, wherein said liner sheet consists essentially of hardwood.

19. The prefabricated heat-insulating and self-supporting end wall panel set forth in claim 16, wherein said liner sheet includes a first section of metal covering the portion of said bulkhead adapted to be disposed downwardly, and a second section of hardwood covering the portion of said bulkhead adapted to be disposed upwardly.

20. The prefabricated heat-insulating and self-supporting end wall panel set forth in claim 19, wherein said weather sheet essentially comprises a metal selected from the class consisting of steel and aluminum, said slab consists essentially of foamed polystyrene, and said first liner section essentially comprises steel.

21. The prefabricated heat-insulating and self-supporting end wall panel set forth in claim 20, wherein said weather sheet has a thickness of the order of 90 mils, each of said plywood sheets has a thickness of about ¼ inch, said slab has a thickness of several inches, said bulkhead has a thickness of about 1 inch, and said first liner section has a thickness of the order of 150 mils.

22. The prefabricated heat-insulating and self-supporting end wall panel set forth in claim 19, wherein said weather sheet further includes a plurality of individual sections each having a length substantially equal to X and a width equal substantially to Y/2, a plurality of screws securing together said weather sheet sections in overlapping edge relationship along a joint extending in the x direction, and said second liner section further includes a plurality of individual strips cemented together in abutting edge relationship, each of said liner strips extending in the y direcion of said end wall panel and having a length equal substantially to Y less the y dimension of said first liner section.

23. A prefabricated heat-insulating and self-supporting side wall panel of rigid unitary sandwich structure comprising, an outer weather sheet of metal, a first sheet of plywood intimately adhered to the inner surface of said weather sheet, a slab of synthetic organic resin of rigid cellular structure intimately adhered to the inner surface of said first plywood sheet, a second sheet of plywood intimately adhered to the inner surface of said slab, and a liner sheet intimately secured to the inner surface of said second plywood sheet, said panel being of block-like configuration and having a substantial length (X) and a substantial width (Y) and a thickness (Z); said first plywood sheet being of composite construction including a number of individual sections cemented together in abutting edge relationship to provide first joints therebetween, each of said first plywood sheet sections extending in the y direction of said side wall panel and having a length of substantially Y, said first joints extending substantially parallel to each other and in the y direction of said side wall panel; said slab being of composite construction including a number of individual block-like sections cemented together in abutting edge relationship to provide second joints therebetween, each of said slab sections extending in the y direction of said side wall panel and having a length of substantially Y, said second joints extending substantially parallel to each other and in the y direction of said side wall panel; said second plywood sheet being of composite construction including a number of individual sections cemented together in abutting edge relationship to provide third joints therebetween, each of said second plywood sheet sections extending in the y direction of said side wall panel and having a length of substantially Y, said third joints extending substantially parallel to each other and in the y direction of said side wall panel; said first and second and third joints being mutually offset with respect to each other in the z direction through said side wall panel.

24. The prefabricated heat-insulating and self-supporting side wall panel set forth in claim 23, wherein said liner sheet consists essentially of metal.

25. The prefabricated heat-insulating and self-supporting side wall panel set forth in claim 23, wherein said liner sheet consists essentially of hardwood.

26. The prefabricated heat-insulating and self-supporting side wall panel set forth in claim 23, wherein said liner sheet includes a first section of metal covering the portion of said second plywood sheet adapted to be disposed downwardly, and a second section of hardwood covering the portion of said second plywood sheet adapted to be disposed upwardly.

27. The prefabricated heat-insulating and self-supporting side wall panel set forth in claim 23, wherein said weather sheet essentially comprises a metal selected from the class consisting of steel and aluminum, and said slab consists essentially of foamed polystyrene.

28. The prefabricated heat-insulating and self-supporting side wall panel set forth in claim 27, wherein said weather sheet has a thickness of the order of 35 mils, each of said plywood sheets has a thickness of about ¼ inch, said slab has a thickness of several inches, and said liner sheet has a thickness on the order of 150 mils.

29. The prefabricated heat-insulating and self-supporting side wall panel set forth in claim 26, wherein said weather sheet further includes a plurality of individual sections each having a length equal substantially to X and a width equal substantially to Y/2, a plurality of screws securing together said weather sheet sections in overlapping edge relationship, said first liner section further includes a plurality of individual strips each having a length equal substantially to Y less the length of said second liner section and a width less than X, and said second liner section further includes a plurality of individual strips each having a length equal substantially to Y less the length of said first liner section and a width less than X, each of said liner strips extending in the $y$ direction of said side wall panel.

References Cited by the Examiner
UNITED STATES PATENTS

| | | | |
|---|---|---|---|
| 2,139,880 | 12/38 | Colucci | 154—45.9 |
| 2,653,358 | 9/53 | MacDonald | 154—45.9 |
| 2,706,164 | 4/55 | Hervey | 161—41 X |
| 2,711,380 | 6/55 | Pintell | 154—45.9 |
| 2,730,772 | 1/56 | Jones | 50—268 X |
| 2,731,682 | 1/56 | Evans | 161—43 X |
| 3,025,198 | 3/62 | Dunn | 154—45.9 |
| 3,041,219 | 6/62 | Steck | 154—45.9 |

EARL M. BERGERT, *Primary Examiner.*

HAROLD ANSHER, *Examiner.*